(12) United States Patent
Liu et al.

(10) Patent No.: US 12,319,224 B2
(45) Date of Patent: Jun. 3, 2025

(54) INTEGRAL IGNITION STRUCTURE AND COMPRESSED-GAS-TYPE FUEL GAS GENERATOR

(71) Applicant: HUBEI INSTITUTE OF AEROSPACE CHEMICAL TECHNOLOGY, Hubei (CN)

(72) Inventors: Liu Liu, Hubei (CN); Wenlong Zhang, Hubei (CN); Long Mao, Hubei (CN); Tongfeng Niu, Hubei (CN); Wei Yang, Hubei (CN); Renshen Song, Hubei (CN); Enguang Huang, Hubei (CN); Jun Gao, Hubei (CN); Wenping Wang, Hubei (CN)

(73) Assignee: HUBEI INSTITUTE OF AEROSPACE CHEMICAL TECHNOLOGY, Hubei (CN)

( * ) Notice: Subject to any disclaimer, the term of this patent is extended or adjusted under 35 U.S.C. 154(b) by 0 days.

(21) Appl. No.: 18/689,157

(22) PCT Filed: Mar. 14, 2023

(86) PCT No.: PCT/CN2023/081460
§ 371 (c)(1),
(2) Date: Mar. 5, 2024

(87) PCT Pub. No.: WO2023/174313
PCT Pub. Date: Sep. 21, 2023

(65) Prior Publication Data
US 2024/0383434 A1 Nov. 21, 2024

(30) Foreign Application Priority Data
Mar. 15, 2022 (CN) .......................... 202210255586.0

(51) Int. Cl.
*B60R 21/26* (2011.01)
*B60R 21/264* (2006.01)
(Continued)

(52) U.S. Cl.
CPC ............ *B60R 21/26* (2013.01); *B60R 21/264* (2013.01); *B60R 21/268* (2013.01); *B60R 21/276* (2013.01); *B60R 2021/26041* (2013.01)

(58) Field of Classification Search
CPC ..... B60R 21/26; B60R 21/264; B60R 21/268; B60R 21/276; B60R 2021/26041; B60R 21/26005; B60R 21/30; B60R 21/239
See application file for complete search history.

(56) References Cited

U.S. PATENT DOCUMENTS 5,690,357 A * 11/1997 Cuevas ................. B60R 21/264
280/736
6,155,600 A * 12/2000 Reynolds .............. B60R 21/264
280/736
(Continued)

FOREIGN PATENT DOCUMENTS

CN 102271973 A 12/2011
CN 206954171 U 2/2018
(Continued)

OTHER PUBLICATIONS

Kaelberer, DE 10256143 A1, Machine Translation of Specification (Year: 2004).*
(Continued)

*Primary Examiner* — Paul N Dickson
*Assistant Examiner* — Matthew Joseph Ganci
(74) *Attorney, Agent, or Firm* — Wolter Van Dyke Davis, PLLC; Eugene J. Molinelli; Michael W. Taylor (57) ABSTRACT

An integral ignition structure and a compressed-gas-type fuel gas generator are provided. The integral ignition struc-
(Continued)

ture comprises an ignition box, an igniter, and an end cover, wherein the ignition box is open at one end, and has a closed end and an open end opposite to each other; the igniter is provided at the closed end; and the end cover is provided at the open end, and is arranged to form, together with the ignition box, an ignition chamber, wherein at least one flow-through hole for communicating with the ignition chamber is formed in the end cover, an ignition composition is provided in the ignition chamber, the igniter is configured to ignite the ignition composition and generate an inflation gas, and the end cover is further configured to be plastically deformed under effect of a pressure of the inflation gas, so as to increase a volume of the ignition chamber.

19 Claims, 7 Drawing Sheets

(51) Int. Cl.
*B60R 21/268* (2011.01)
*B60R 21/276* (2006.01)

(56) References Cited

U.S. PATENT DOCUMENTS

| | | | |
|---|---|---|---|
| 2007/0158934 A1 | 7/2007 | Lee et al. | |
| 2008/0136153 A1 | 6/2008 | Yamashita et al. | |
| 2011/0265678 A1 | 11/2011 | Sasamoto et al. | |
| 2012/0153602 A1 | 6/2012 | Fischer | |
| 2019/0001918 A1 | 1/2019 | Ukita et al. | |

FOREIGN PATENT DOCUMENTS

| | | | | |
|---|---|---|---|---|
| CN | 108602486 A | | 9/2018 | |
| CN | 111186410 A | | 5/2020 | |
| CN | 114030440 A | | 2/2022 | |
| CN | 114523932 A | | 5/2022 | |
| DE | 10256143 A1 | * | 6/2004 | ........... B60R 21/261 |
| DE | 102015221987 A1 | | 5/2017 | |
| JP | 2017-001588 A | | 1/2017 | |
| JP | 2021-104707 A | | 7/2021 | |
| WO | 2023/174313 A1 | | 9/2023 | |

OTHER PUBLICATIONS

International Search Report and Written Opinion received for PCT Patent Application No. PCT/CN2023/081460, mailed on May 30, 2023, 11 pages (3 pages of English Translation and 8 pages of Original Document).

Notice of Allowance received for Chinese Patent Application No. 202210255586.0, mailed on Mar. 1, 2023, 3 pages (2 pages of English Translation and 1 page of Original Document).

Office Action received for Chinese Patent Application No. 202210255586.0, mailed on Nov. 3, 2022, 12 pages (5 pages of English Translation and 7 pages of Original Document).

* cited by examiner

INTEGRAL IGNITION STRUCTURE AND COMPRESSED-GAS-TYPE FUEL GAS GENERATOR

CROSS-REFERENCE TO RELATED APPLICATIONS

This application is a U.S. National Phase Application, which claims priority to International Application No. PCT/CN2023/081460, filed Mar. 14, 2023, which claims priority to the Chinese patent application with the filing No. 202210255586.0 filed with the China National Intellectual Property Administration on Mar. 15, 2022 and entitled "Integral Ignition Structure and Compressed-gas-type Fuel Gas Generator", the contents of which are incorporated herein by reference in entirety.

TECHNICAL FIELD

The present disclosure relates to the field of airbags, and in particular to an integral ignition structure and a compressed-gas-type fuel gas generator.

BACKGROUND ART

Many types of fuel gas generator devices for inflating inflatable restraint system airbags have been disclosed in the art. One class of such fuel gas generator devices is commonly called as "compressed-gas-type fuel gas generator", and generally refers to various fuel gas generator devices that contain a compressed gas.

As is well-known, a particular type of compressed-gas-type fuel gas generator (sometimes called as "gas-storage-type fuel gas generator") contains only a certain amount of stored compressed gas, and this stored compressed gas is selectively released so as to inflate an associated airbag. Another known type of compressed-gas-type fuel gas generator is commonly called as "hybrid-type fuel gas generator". In such fuel gas generator device, an inflation gas is generated by a combination of the stored compressed gas and a combustion gas of a gas generating material (e.g., chemical agent).

Compared with frontal impact and frontal airbags, side impact or collision that causes or leads to deployment of a side airbag or a curtain airbag usually results in significant reduction of time between the time when the deployment event occurs (e.g., vehicle collision or impact) and the time when the occupant contacts the deployed airbag. Therefore, in order to satisfy or meet this requirement, "time to first gas" (TTFG) must be shortened, so as to use a strong pressure wave to quickly open a sealing element (e.g. a rupture disk) at an exhaust end. In order to ensure a strong enough pressure wave, an ignition chamber filled with a chemical agent therein is usually added behind an igniter, and a high-temperature combustion gas thereof can accelerate and supplement gas output.

It has been found from researches of the inventors that, the method of direct ignition with a chemical agent adopted in the prior art has the following disadvantages: firstly, temperature sensitivity of the chemical agent itself will bring about different initial pressure values of the chemical agent in high-temperature, low-temperature, and normal-temperature environments, which directly affects blasting time of the sealing element at the exhaust end, and in turn affects the TTFG; secondly, when the chemical agent is combusted in the same space in different temperature environments, pressures in the combustion chamber are quite different; and finally, in order to meet requirements of safety factor at high temperatures, generally, a shell of the fuel gas generator must be made of a steel pipe or steel plate with higher strength, or a thickness of the material itself is increased, all of which also directly affect costs and volume, thus causing unwanted wastes.

SUMMARY

Objectives of the present disclosure are at least, for example, providing an integral ignition structure and a compressed-gas-type fuel gas generator, which can effectively reduce a pressure difference of an ignition chamber generated by ignition of a chemical agent, and can ensure consistency of starting pressure TTPG at different temperatures, and effectively reduce the starting pressure and the pressure of the ignition chamber at high temperatures, which is beneficial to reducing material costs and weight of a shell.

The present disclosure can be realized according to the following embodiments.

Some embodiments of the present disclosure provide an integral ignition structure. The integral ignition structure may include an ignition box, an igniter, and an end cover. The ignition box is open at one end, and has a closed end and an open end opposite to each other. The igniter can be provided at the closed end. The end cover can be provided at the open end, and is arranged to form, together with the ignition box, an ignition chamber. Moreover, a flow-through hole for communicating the ignition chamber can be formed in the end cover. An ignition composition can be provided in the ignition chamber. The igniter can be configured to ignite the ignition composition and generate an inflation gas. The end cover can be further configured to be plastically deformed under effect of a pressure of the inflation gas, so as to increase a volume of the ignition chamber.

In an optional embodiment, the end cover can be welded on the ignition box, so as to directly form the ignition chamber.

In an optional embodiment, the end cover can include a connection ring and a deformable plate which are integrally arranged. The connection ring can be fixedly arranged on an inner side wall of the ignition box. The deformable plate can block the open end. The flow-through hole can be formed in the deformable plate. The deformable plate can be configured to be plastically deformed in a direction away from the closed end under the effect of the pressure of the inflation gas.

In an optional embodiment, an end portion of the connection ring can be flush with an end portion of the open end of the ignition box.

In an optional embodiment, a plurality of the flow-through holes can be formed. The plurality of flow-through holes can be evenly distributed at a central position of the deformable plate, and each of the flow-through holes may have a size smaller than a particle size of the ignition composition, so as to prevent the ignition composition from rushing out of the ignition chamber.

In an optional embodiment, the central position of the deformable plate can protrude towards a direction away from the closed end, so as to form a boss structure, and the flow-through holes can be formed in the boss structure.

In an optional embodiment, the connection ring may include a first ring portion and a second ring portion which are integrally arranged. The first ring portion can be fixedly arranged on an inner side wall of the ignition box. The second ring portion may have one side connected to the first ring portion, and the other side connected to the deformable plate. The second ring portion can be configured to be driven by the deformable plate to be detached from the inner side wall of the ignition box.

In an optional embodiment, a plurality of flow-assisting holes can be formed in the second ring portion. The plurality of flow-assisting holes can be configured for communicating the ignition chamber and inside of the outer tube communicate when the second ring portion is detached from the inner side wall of the ignition box.

In an optional embodiment, an end surface of the closed end can be provided with a recessed portion that is recessed towards the open end. A surface of an end of the recessed portion close to the open end can be provided with an indentation, so as to locally reduce a thickness of the recessed portion. The igniter can be at least partially accommodated in the recessed portion, and is configured to break through the indentation to ignite the ignition composition.

In an optional embodiment, the igniter may include an electric detonator and a fixed base. The electric detonator can be accommodated in the recessed portion. The fixed base can be connected to the electric detonator, and is at least partially disposed outside the recessed portion. The fixed base is sealedly connected to the ignition box.

In an optional embodiment, a diameter of the recessed portion can be slightly greater than a diameter of the electric detonator. A recess depth of the recessed portion can be slightly greater than a height of the electric detonator, so as to enable the electric detonator to be completely accommodated in the recessed portion. The fixing base is fixed on the ignition box outside the recessed portion by means of welding, and is kept fixed and sealed.

In an optional embodiment, a sealing ring can be sleeved on the electric detonator, and the sealing ring can be configured to block the recessed portion.

Another embodiment of the present disclosure provides a compressed-gas-type fuel gas generator, which may include an outer tube and the integral ignition structure according to any one of the preceding embodiments. The outer tube can be filled with a compressed gas. The ignition box can be fixedly arranged at one end of the outer tube. The flow-through hole can be configured for communicating the ignition chamber and an inner space of the outer tube.

Beneficial effects of the embodiments of the present disclosure at least include, for example:

for the integral ignition structure and the compressed-gas-type fuel gas generator provided in the present disclosure, by providing the end cover at the open end of the ignition box, the end cover and the ignition box are arranged to form the ignition chamber, and the ignition composition is provided in the ignition chamber. The end cover is made of a plastic material, and during practical ignition, the ignition composition is ignited by the igniter. A large amount of inflation gas is generated after the ignition composition is combusted, and the internal pressure is quickly built up in the ignition chamber. Under the effect of the pressure of the inflation gas, the end cover is plastically deformed, so as to increase the volume of the ignition chamber, and reduce the pressure difference of the ignition chamber generated by the ignition composition at different temperatures. Compared with the related art, in the present disclosure, by providing the end cover capable of being plastically deformed, it is realized that when the compressed-gas-type fuel gas generator is detonated at a high temperature, a normal temperature, and a low temperature, and when the weight of the chemical agent is the same, different plastic deformation sizes are generated at different combustion temperatures, so as to form spaces of the ignition chamber of different sizes and volumes, effectively reduce the pressure difference of the ignition chamber generated thereby. Moreover, in cooperation with the use of the flow-through hole, a communication structure between the ignition chamber and the compressed gas chamber is optimized, thus, the consistency of the starting pressure TTFG at a high temperature, a normal temperature, and a low temperature is ensured, and the starting pressure and the pressure of the combustion chamber at high temperatures are effectively reduced, which is beneficial to reducing the material costs and weight of the shell.

BRIEF DESCRIPTION OF DRAWINGS

In order to more clearly illustrate technical solutions of embodiments of the present disclosure, drawings which need to be used in the embodiments will be introduced briefly below. It should be understood that the following drawings merely show embodiments of the present disclosure, therefore, they should not be considered as limitation to the scope. Those ordinarily skilled in the art still could obtain other relevant drawings according to these drawings, without using any inventive efforts.

REFERENCE SIGNS

100—integral ignition structure; 110—ignition box; 111—open end; 113—closed end; 115—recessed portion; 117—indentation; 130—igniter; 131—electric detonator; 133—fixed base; 150—end cover; 151—connection ring; 153—deformable plate; 155—boss structure; 157—first ring portion; 159—second ring portion; 170—ignition chamber; 171—ignition composition; 190—flow-through hole; 191—flow-assisting hole; 200—compressed-gas-type fuel gas generator; 210—outer tube; 230—guide cover.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the drawings in the embodiments of the present disclosure. Obviously, only some but not all embodiments of the present disclosure are described. Generally, components in the embodiments of the present disclosure described and shown in the drawings herein may be arranged and designed in various different configurations.

Therefore, the following detailed description of the embodiments of the present disclosure provided in the drawings is not intended to limit the scope of protection of the present disclosure, but merely represents chosen embodiments of the present disclosure. Based on the embodiments in the present disclosure, all of other embodiments obtained by those ordinarily skilled in the art, without using any inventive efforts, fall within the scope of protection of the present disclosure.

It should be noted that similar reference signs and letters represent similar items in the following drawings, therefore, once a certain item is defined in one drawing, it is not needed to be defined or explained in subsequent drawings.

In the description of the present disclosure, it should be noted that orientation or positional relationships indicated by terms such as "upper", "lower", "inner", and "outer", if appear, are based on orientation or positional relationships shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure.

Besides, terms such as "first" and "second", if appear, are merely used to distinguish the description, but should not be construed as indicating or implying importance in the relativity.

As disclosed in Background Art, many types of fuel gas generator devices for inflating inflatable restraint system airbags have been disclosed in the art. One class of such fuel gas generator devices is commonly called as "compressed-gas-type fuel gas generator", and generally refers to various fuel gas generator devices that contain a compressed gas. As is well-known, a particular type of compressed-gas-type fuel gas generator (sometimes called as "gas-storage-type fuel gas generator") contains only a certain amount of stored compressed gas, and this stored compressed gas is selectively released so as to inflate an associated airbag. Another known type of compressed-gas-type fuel gas generator is commonly called as "hybrid-type fuel gas generator". In such fuel gas generator device, an inflation gas is generated by a combination of the stored compressed gas and a combustion gas of a gas generating material (e.g., chemical agent).

Side airbags (sometimes also called as side impact airbags) and curtain airbags are widely used in automotive technologies today. Generally, the side airbag is stored or located in an internal structure such as a column of a vehicle or a backrest of a vehicle seat. The curtain airbag is usually mounted on the top or front of the automobile, and helps to protect an occupant in the event of impact or collision, particularly protecting chest and head of the occupant during side impact or collision. In implementation, a side airbag system is usually installed so as to prevent or otherwise minimize or reduce injury of the occupant caused by collision with side or door of the vehicle, and prevent the occupant from being injured by fragments of broken door and window, or prevent the occupant from tilting towards the vehicle door in the event of side collision of the vehicle, or prevent the occupant from being squeezed out of vehicle body when the vehicle door is recessed inward. The compressed-gas-type fuel gas generators have been widely applied in side airbags and curtain airbag systems.

Compared with frontal impact and frontal airbags, side impact or collision that causes or leads to deployment of the side airbag usually results in significant reduction of time between the time when the deployment event (e.g., vehicle collision or impact) occurs and the time when the occupant contacts the deployed airbag. Therefore, in order to satisfy or meet this requirement, "time to first gas" (TTFG) must be shortened, so as to use a strong pressure wave to quickly open a sealing element (e.g. a rupture disk) at an exhaust end. In order to ensure a strong enough pressure wave, an ignition chamber filled with a chemical agent therein is usually added behind an igniter, and a high-temperature combustion gas thereof can accelerate and supplement gas output.

However, in the prior art, an ignition composition is provided in an ignition chamber. The ignition composition is in direct communication with a compressed gas chamber, when the igniter ignites the ignition composition, an inflation gas is generated in the ignition chamber, and is directly conducted to the compressed gas chamber. However, this structural form inevitably brings about the following technical problems.

1. Due to the temperature sensitivity of the chemical agent, it will bring about different starting pressure values in high-temperature, low-temperature, and normal-temperature environments, which undoubtedly directly affects blasting time of the sealing element at the exhaust end, and in turn affects the TTPG.
2. When the chemical agent is combusted in the same space in different temperature environments, inflation gas pressures generated by the combustion thereof are quite different, which results in a very large difference in gas supplement capacity for the compressed gas chamber, thereby affecting the TTPG.
3. Generally, since local air pressure is relatively high during ignition, safety factor requirements at high temperatures are not met. Generally, a shell of the fuel gas generator must be made of a steel pipe or steel plate with higher strength, or a thickness of the material itself needs to be increased, which undoubtedly also directly affects costs and volume of the product, and causes unwanted wastes.

In order to solve the above problems, the present disclosure provides a novel integral ignition structure 100 and a compressed-gas-type fuel gas generator 200. It should be noted that features in the embodiments of the present disclosure can be combined with each other without conflict.

Referring to FIG. 1 to FIG. 8, some embodiments of the present disclosure provide an integral ignition structure 100. The integral ignition structure 100 is applicable to a compressed-gas-type fuel gas generator 200, and is capable of effectively reducing a pressure difference generated by ignition of a chemical agent at different temperatures, and ensuring consistency of starting pressure TTPG at different temperatures, thus effectively reducing the starting pressure and a pressure of an ignition chamber 170 at high temperatures, which is beneficial to reducing material costs and weight of a shell, and meanwhile optimizing an ignition structure, simplifying an assembling process, and reducing manufacturing costs.

The present embodiment provides an integral ignition structure 100, including an ignition box 110, an igniter 130, and an end cover 150. The ignition box 110 is open at one end, and has a closed end 113 and an open end 111 opposite to each other. The igniter 130 is provided at the closed end 113. The end cover 150 is provided at the open end 111, and is arranged to form, together with the ignition box, an ignition chamber 170. A flow-through hole 190 for communicating with the ignition chamber 170 is provided in the end cover 150. An ignition composition 171 is provided in the ignition chamber 170. The igniter 130 is configured to ignite the ignition composition 171 and generate an inflation gas. The end cover 150 is further configured to be plastically deformed under the effect of a pressure of the inflation gas, so as to increase a volume of the ignition chamber 170.

Figure 1:
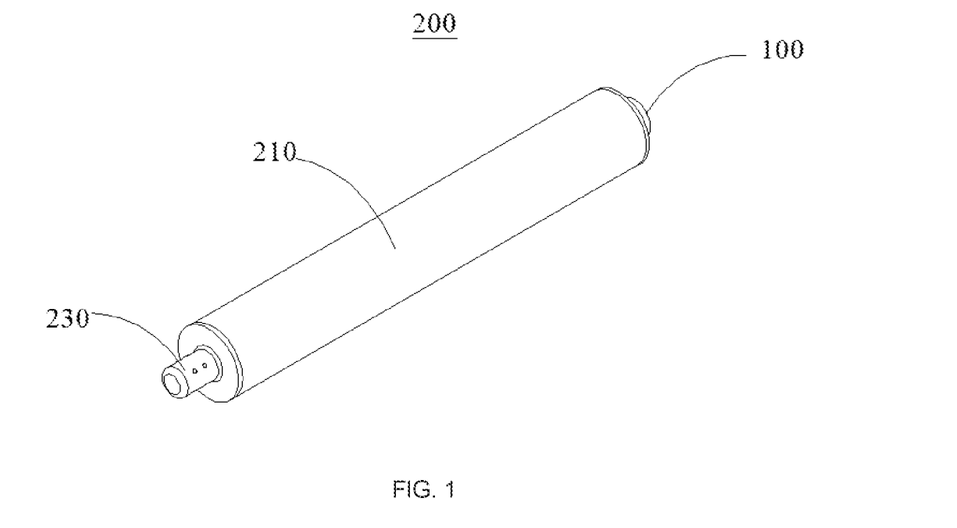
FIG. 1 is a schematic diagram of an external structure of a compressed-gas-type fuel gas generator in some embodiments of the present disclosure.
Figure 2:
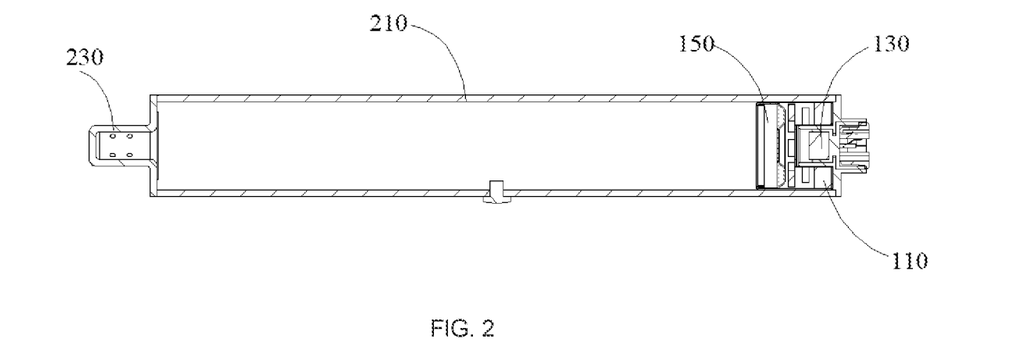
FIG. 2 is a schematic diagram of an internal structure of the compressed-gas-type fuel gas generator in some embodiments of the present disclosure.
Figure 3:
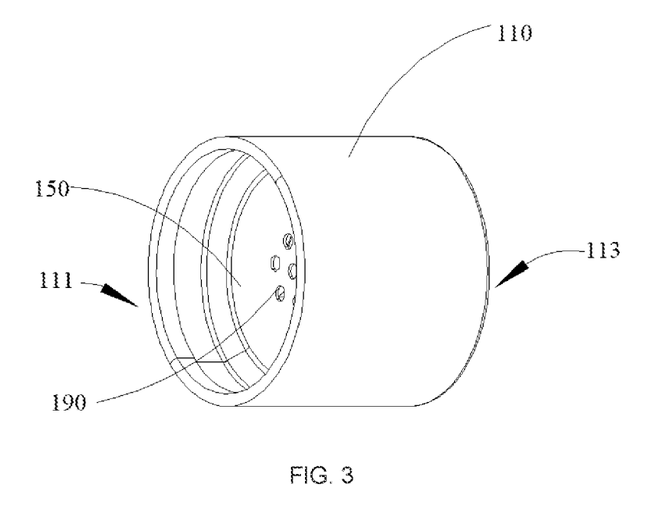
FIG. 3 is a schematic diagram of a connection structure of an end cover and an ignition box in FIG. 1 from a first perspective.
Figure 4:
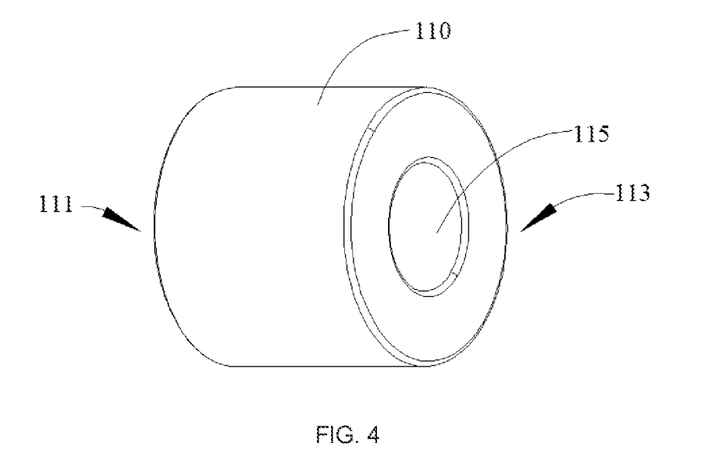
FIG. 4 is a schematic diagram of the connection structure of the end cover and the ignition box in FIG. 1 from a second perspective.

Specifically, the integral ignition structure 100 in the present embodiment is applicable to the compressed-gas-type fuel gas generator 200. The compressed-gas-type fuel gas generator 200 includes the integral ignition structure 100 and an outer tube 210. The outer tube 210 is filled with a compressed gas. The ignition box 110 is fixedly arranged at one end of the outer tube 210, and a compressed gas chamber is formed inside the outer tube 210 outside the ignition box 110. The compressed gas is filled inside the compressed gas chamber, and meanwhile, the flow-through hole makes the ignition chamber 170 and the compressed gas chamber communicate. The other end of the outer tube 210 is provided with a guide cover 230 and a rupture disk. In the above, a structure and a blasting principle of the guide cover 230 and the rupture disk are consistent with the rupture structure in the conventional art, and will not be described in detail herein again.

In the present embodiment, the ignition box 110 is in a deep cup shape, and has the closed end 113 and the open end 111 opposite to each other. In the above, the ignition box 110 is welded on an inner wall of the outer tube 210, so as to be fixed. The ignition box 110 can be punch formed by a cold-rolled or hot-rolled steel material that is easy to weld and has relatively high strength, for example, a steel plate or a steel belt, with one end being closed and the other end being open. The closed end 113 of the ignition box 110 is close to an end portion of the outer tube 210, and the open end 111 is closer to a center of the outer tube 210, and extends to the compressed gas chamber. The igniter 130 is fixedly arranged at the closed end 113 of the ignition box 110. The end cover 150 is fixedly arranged at the open end 111 of the ignition box 110. The flow-through hole 190 in the end cover 150 communicates with the ignition chamber 170 and the compressed gas chamber simultaneously.

It should be noted that, in the present embodiment, the end cover 150 is welded on the ignition box 110, and directly forms the ignition chamber 170. The igniter 130 and the ignition box 110 are integrally assembled, and are fixed and sealed by welding, so that it can be assembled in advance and then stored in a warehouse for later use, thus improving the manufacturing efficiency.

Figure 5:
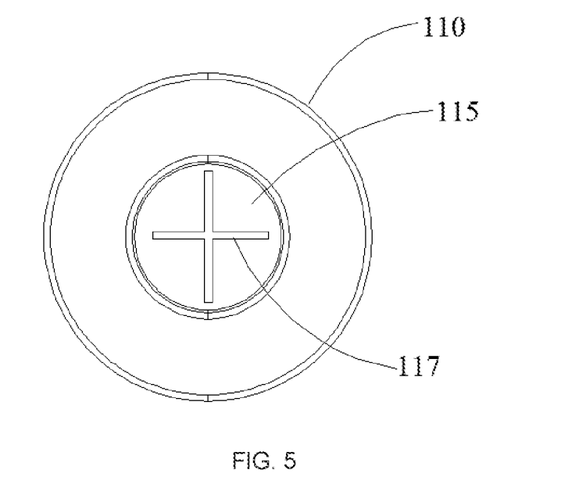
FIG. 5 is a structural schematic diagram of a recessed portion in FIG. 4.

In the present embodiment, an end surface of the closed end 113 is provided with a recessed portion 115 that is recessed towards the open end 111. A surface of one end of the recessed portion 115 close to the open end 111 is provided with an indentation 117, so as to locally reduce a thickness of the recessed portion 115. The igniter 130 is at least partially accommodated in the recessed portion 115, and is configured to break through the indentation 117 so as to ignite the ignition composition 171. Specifically, the recessed portion 115 is provided at the center of the closed end 113, the recessed portion 115 is recessed towards the open end 111 and is in a stepped shape, a diameter of recessed step is slightly greater than a diameter of a part of the igniter 130 extending into the recessed portion 115, and an end portion of the recessed portion 115 close to the open end 111 is closed, so that the ignition chamber 170 remains sealed and isolated from the outside when being not ignited.

In the present embodiment, the indentation 117 in the recessed portion 115 may be in a cross shape or a shape of the Union Jack, and can be carved to at least half of the thickness of the recessed portion 115. When being ignited, the igniter 130 can preferentially break through the recessed portion 115 at the indentation 117, so that an ignition point of the igniter 130 is in communication with the ignition chamber 170, thereby realizing an ignition operation of the ignition composition 171.

The igniter 130 includes an electric detonator 131 and a fixed base 133. The electric detonator 131 is accommodated in the recessed portion 115. The fixed base 133 is connected to the electric detonator 131, and is at least partially disposed outside the recessed portion 115. Moreover, the fixed base 133 is sealedly connected to the ignition box 110. Specifically, the diameter of the recessed portion 115 is slightly greater than a diameter of the electric detonator 131, and a recess depth of the recessed portion 115 is slightly greater than a height of the electric detonator 131, so that the electric detonator 131 can be completely accommodated in the recessed portion 115. The fixing base 133 can be fixed on the ignition box 110 outside the recessed portion 115 by means of welding, and is kept fixed and sealed. The welding can be in a manner of laser or resistance, etc. With regard to a mounting structure and an ignition principle of the igniter 130, reference can be specifically made to relevant description in related art.

In the present embodiment, a sealing ring (not shown) is sleeved on the electric detonator 131, and the sealing ring is configured to block the recessed portion 115. Specifically, the sealing ring may be a heat-resistant rubber ring, and it is located on the electric detonator close to a position of the recessed portion 115 provided with the indentation 117, so that a local inner ignition cavity is formed inside the recessed portion 115. When an end portion of the electric detonator is ignited, under the blocking effect of the sealing ring, an air pressure in the inner ignition cavity rapidly rises, and the indentation 117 can be rapidly broken through, so that the ignition chamber 170 is in communication with the recessed portion 115, and thus the electric detonator can ignite the ignition composition 171 located in the ignition chamber 170, completing the ignition.

Figure 6:
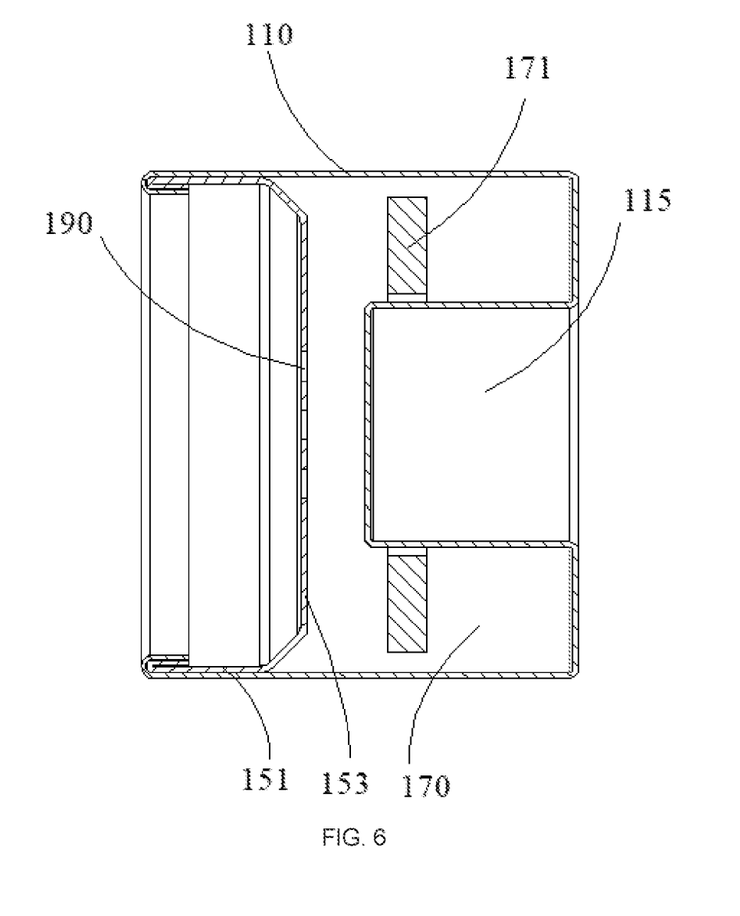
FIG. 6 is a sectional view of the connection structure of the end cover and the ignition box in FIG. 2.

Referring to FIG. 6 in combination, the end cover 150 includes a connection ring 151 and a deformable plate 153 which are integrally arranged. The connection ring 151 is fixedly arranged on an inner side wall of the ignition box 110. The deformable plate 153 blocks the open end 111. The flow-through holes 190 are provided in the deformable plate 153. The deformable plate 153 is configured to be plastically deformed in a direction away from the closed end 113 under the effect of pressure of the inflation gas. Specifically, in the present embodiment, the connection ring 151 is fixed on the inner side wall of the ignition box 110, and an end portion of the connection ring 151 is flush with an end portion of the open end 111 of the ignition box 110.

It should be noted that the connection ring 151 and the deformable plate 153 are integrally formed herein. In the above, the end cover 150 as a whole can be punch formed by a cold-rolled or hot-rolled thin steel material, for example, a steel plate or a steel belt, and strength and thickness of the material can be smaller than a material used for the ignition box 110. Moreover, the end cover 150 is in a shallow cup shape, and includes the connection ring 151 and the deformable plate 153. The deformable plate 153 is closer to the closed end 113 of the ignition box 110 with respect to the connection ring 151. In the above, the connection ring 151 can be fixed to an inner wall of the open end 111 of the ignition box 110 by means of welding or several times of crimping, and preferably, the connection ring 151 is fixed by means of laser, resistance and other welding methods.

In the present embodiment, a plurality of flow-through holes 190 are provided. The plurality of flow-through holes 190 are evenly distributed at a central position of the deformable plate 153, and each flow-through hole 190 has a size smaller than a particle size of the ignition composition 171, so as to prevent the ignition composition 171 from rushing out of the ignition chamber 170. Specifically, the flow-through holes 190 can be distributed in a honeycomb shape at the center of the deformable plate 153, and have a size smaller than that of the ignition composition 171, thereby the ignition composition 171 can be prevented from rushing out together to the compressed gas chamber and causing further combustion. During ignition, the ignition composition 171 is ignited by the igniter 130, a large amount of inflation gas is generated in the ignition chamber 170, wherein a part of the inflation gas can flow into the compressed gas chamber from the plurality of flow-through holes 190, while the remaining inflation gas that is too late to flow in will act on the deformable plate 153, so that the deformable plate 153 is plastically deformed towards the open end 111, and forms a structure in a circular arch shape, so that a volume of the ignition chamber 170 is increased. Since the end cover 150 also has a certain restriction effect on the inflation gas when being plastically deformed, through adjusting effect of the plastic deformation, the pressure inside the ignition box 110 can be kept fluctuating within a relatively narrow range, further ensuring that a flow rate and a pressure of the gas flowing into the compressed gas chamber also fluctuate within a relatively narrow range.

Figure 7:
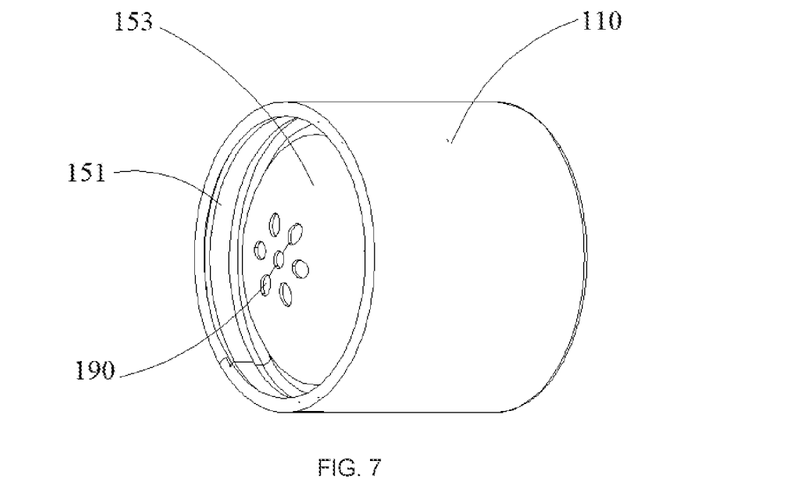
FIG. 7 is a structural schematic diagram of the end cover and the ignition box in FIG. 2 in an ignition state.
Figure 8:
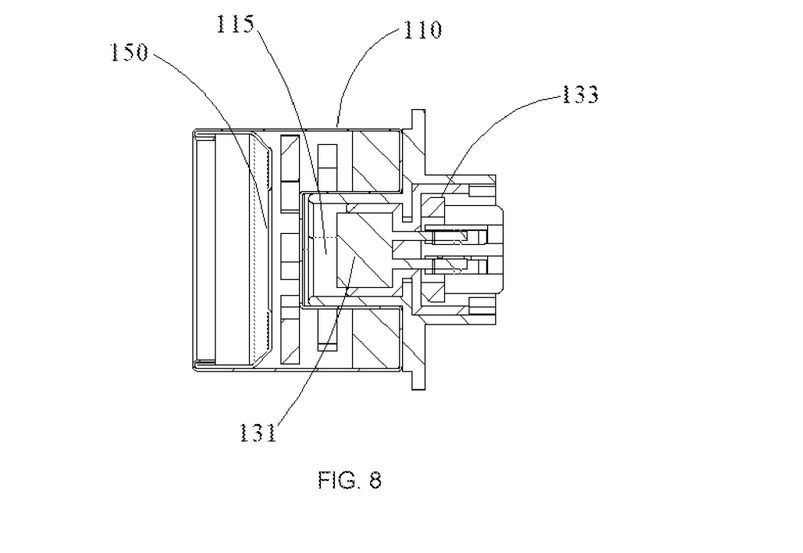
FIG. 8 is a schematic diagram of an integral ignition structure in some embodiments of the present disclosure.

A working principle of the integral ignition structure 100 provided in the present embodiment is as follows: the electric detonator 131 is detonated when receiving a current, and energy generated acts on the recessed portion 115. When a set bursting pressure is reached, the weak indentation 117 on the surface of the recessed portion 115 bursts directionally according to a preset position, and the ignition composition 171 in the ignition chamber 170 is ignited, and then a large amount of gas is rapidly generated. Since a gas generation velocity is quite fast, the gas is too late to flow out through the flow-through holes 190 in the deformable plate 153, therefore, the gas in the ignition chamber 170 rapidly builds up an internal pressure in an extremely short period of time. The air pressure acts on the deformable plate 153, and causes the deformable plate 153 to be plastically deformed and to be in a circular arch shape. Due to the temperature sensitivity of the agent, the combustion velocity increases as the temperature rises, and the plastic deformation increases as the temperature rises, and the volume of space of the ignition chamber 170 increases as the plastic deformation increases. That is to say, the adjusting effect can be achieved through the deformable plate 153, then even if the starting pressure values of the ignition composition 171 are different, the gas with a relatively uniform pressure can be output to the compressed gas chamber, and finally, the pressure in the ignition chamber 170 is kept fluctuating within a relatively narrow range, further ensuring that the flow rate and pressure of the gas flowing into the compressed gas chamber also fluctuate within a relatively narrow range, and further ensuring that the TTPG fluctuates within a relatively small range, so that a relatively consistent TTPG can be achieved at different temperatures. Through the plastic deformation of the deformable plate 153, an excessively high air pressure in the ignition chamber 170 can be avoided, the pressure of the gas entering the compressed gas chamber is adjusted, and meanwhile, requirements to strength of the shell are lower, so that both the end cover 150 and the ignition box 110 can be made of a relatively thin material, and the material is undoubtedly saved.

The present embodiment further provides a method of assembling an integral ignition structure 100, wherein it can be assembled through the following steps:

1. placing an electric detonator 131 into a fixed base 133, and sleeving an O-shaped sealing ring on a charging end at a tail of the electric detonator 131;
2. placing a closed end 113 of an ignition box 110 on a plane of a fixed base 133, wherein at that time, the charging end at the tail of the electric detonator 131 is just embedded into a recessed portion 115, and welding and fixing the closed end 113 of the ignition box 110 to the fixed base 133 by means of laser welding;
3. sealing flow-through hole in an end cover 150 of the ignition box 110 with a sealing foil;
4. weighing a certain amount of ignition composition 171 and filling the same into the ignition box 110; and
5. placing the end cover 150 into the ignition box 110, with an open end 111 flush, and welding and fixing side walls of the two parts at the open end 111 by means of laser welding, and assembling them into a semi-finished product and storing the same in a warehouse for later use.

To sum up, for the integral ignition structure 100 provided in the present embodiment, by providing the end cover 150 capable of being plastically deformed, it is realized that when the compressed-gas-type fuel gas generator 200 is detonated at a high temperature, a normal temperature, and a low temperature, and when the weight of the chemical agent is the same, different plastic deformation sizes are generated at different combustion temperatures, so as to form spaces of the ignition chamber 170 of different sizes and volumes, effectively reduce the pressure difference of the ignition chamber 170 generated thereby. Moreover, in cooperation with the use of the flow-through hole 190, a communication structure between the ignition chamber 170 and the compressed gas chamber is optimized, thus, the consistency of the starting pressure TTFG at a high temperature, a normal temperature, and a low temperature is ensured, and the starting pressure and the pressure of the combustion chamber at high temperatures are effectively reduced, which is beneficial to reducing the material costs and weight of the shell. Specifically, in the present embodiment, by utilizing the plastic deformation characteristics inherent to metal materials, it is realized that when the compressed-gas-type fuel gas generator 200 is detonated at a high temperature, a normal temperature, and a low temperature, and when a filling amount of the chemical agent is the same, the end cover 150 in the ignition chamber 170 generates different plastic deformation sizes at different combustion temperatures, and the spaces of the ignition chamber 170 of different sizes and volumes are formed, effectively reducing the pressure difference of the ignition chamber 170 generated thereby, and stabilizing the time of forming a first blast wave, thus, the consistency of rupture time of the rupture disk is improved, and the starting time TTFG of the pressure is stabilized. Meanwhile, structural designs of the parts are simplified, components and type of the agent formulation are simplified (without the need of formulating special agents at different temperatures), which is beneficial to reducing the production costs, particularly costs of agent manufacturing process, and at the same time, reduction of high-temperature internal pressure also can realize use of a low-strength steel pipe for the shell, thus reducing purchasing costs of steel pipe.

Figure 9:
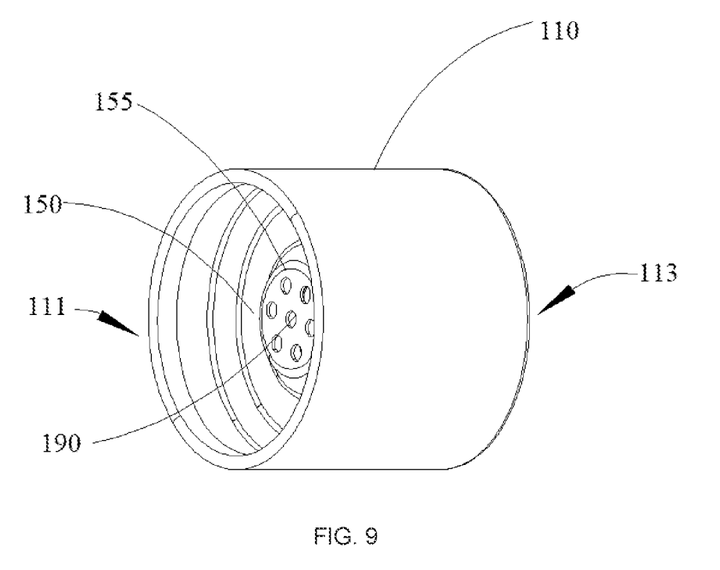
FIG. 9 is a schematic diagram of the connection structure of the end cover and the ignition box in some other embodiments of the present disclosure from the first perspective.
Figure 10:
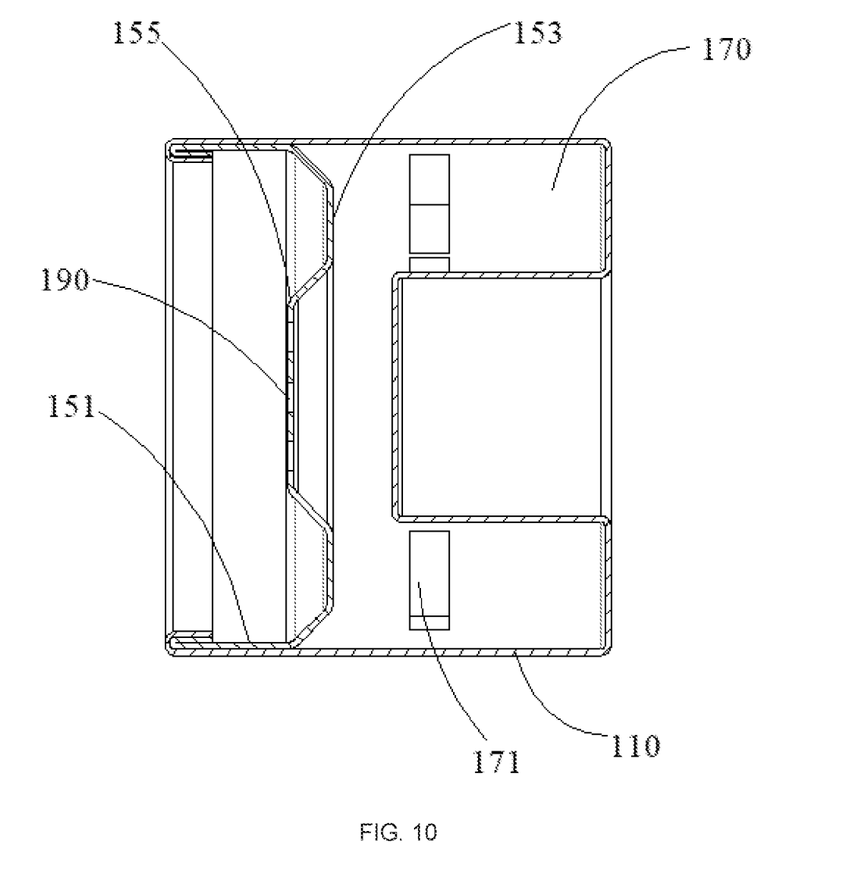
FIG. 10 is a schematic diagram of the connection structure of the end cover and the ignition box in some other embodiments of the present disclosure from the second perspective.

Referring to FIG. 9 and FIG. 10 in combination, some other embodiments of the present disclosure provide an integral ignition structure 100, of which a basic structure and a principle as well as technical effects produced are the same as those in some embodiments in the above. For the sake of concise description, reference can be made to corresponding contents in some embodiments in the above for those not mentioned in the present embodiment.

In the present embodiment, the integral ignition structure 100 includes an ignition box 110, an igniter 130, and an end cover 150. The ignition box 110 is open at one end, and has a closed end 113 and an open end 111 opposite to each other. The igniter 130 is provided at the closed end 113. The end cover 150 is provided at the open end 111, and is arranged to form, together with the ignition box 110, an ignition chamber 170. Flow-through holes 190 for communicating with the ignition chamber 170 are provided in the end cover 150. An ignition composition 171 is provided in the ignition chamber 170. The igniter 130 is configured to ignite the ignition composition 171 and generate an inflation gas. The end cover 150 is further configured to be plastically deformed under the effect of pressure of the inflation gas, so as to increase a volume of the ignition chamber 170.

The end cover 150 includes a connection ring 151 and a deformable plate 153 which are integrally arranged. The connection ring 151 is fixedly arranged on an inner side wall of the ignition box 110. The deformable plate 153 blocks the open end 111. The flow-through holes 190 are provided in the deformable plate 153. The deformable plate 153 is configured to be plastically deformed in a direction away from the closed end 113 under the effect of pressure of the inflation gas.

In the present embodiment, a central position of the deformable plate 153 protrudes towards a direction away from the closed end 113, so as to form a boss structure 155, and the flow-through holes 190 are provided in the boss structure 155. Specifically, the boss structure 155 is provided at the central position of the deformable plate 153. The boss structure 155 can be formed through a stamping process, and is in an arched shape of a truncated cone, a surface thereof is provided with several flow-through holes 190, and an aperture of each flow-through hole 190 is smaller than a size of the ignition composition 171.

In the present embodiment, by forming the boss structure 155 at the central position of the deformable plate 153, during the ignition and the deformation, since the boss structure 155 is provided, certain direction guidance effect can be achieved for the plastic deformation, that is, the deformation starts from the boss structure 155. Thus, the plastic deformation is directionally guided to a certain extent, so that the plastic deformation is more uniform and faster.

A working principle of the integral ignition structure 100 provided in the present embodiment is as follows: an electric detonator 131 is detonated when receiving a current, and energy generated acts on a recessed portion 115. When a set bursting pressure is reached, a weak indentation 117 on the surface of the recessed portion 115 bursts directionally according to a preset position, and the ignition composition 171 in the ignition chamber 170 is ignited, and then a large amount of gas is rapidly generated. Since a gas generation velocity is quite fast, the gas is too late to flow out through the flow-through holes 190 in the boss structure 155, therefore, the gas in the ignition chamber 170 rapidly builds up an internal pressure in an extremely short period of time. The air pressure acts on the deformable plate 153, and plastic deformation is generated at the boss structure 155 on the deformable plate 153. Due to the temperature sensitivity of the agent, the combustion velocity increases as the temperature rises, the plastic deformation increases as the temperature rises, and the volume of the space of the ignition chamber 170 increases as the plastic deformation increases. Finally, the pressure in the ignition chamber 170 is kept fluctuating within a relatively narrow range, ensuring that a flow rate and a pressure of the gas flowing into the compressed gas chamber also fluctuate within a relatively narrow range.

Figure 11:
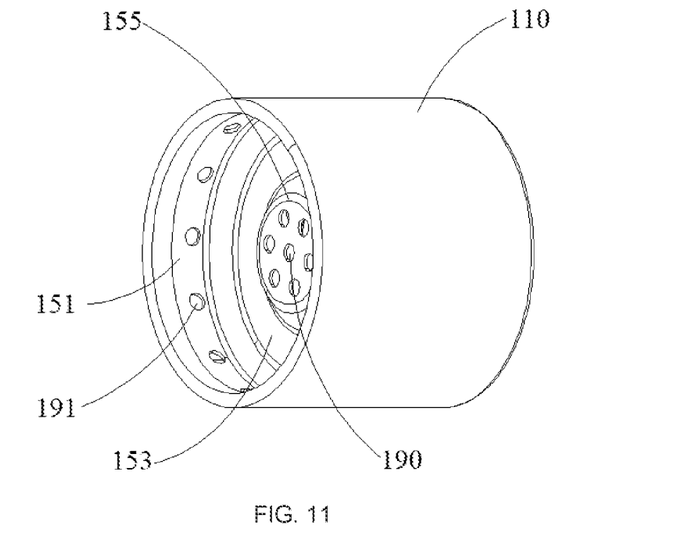
FIG. 11 is a schematic diagram of the connection structure of the end cover and the ignition box in some further embodiments of the present disclosure from the first perspective.
Figure 12:
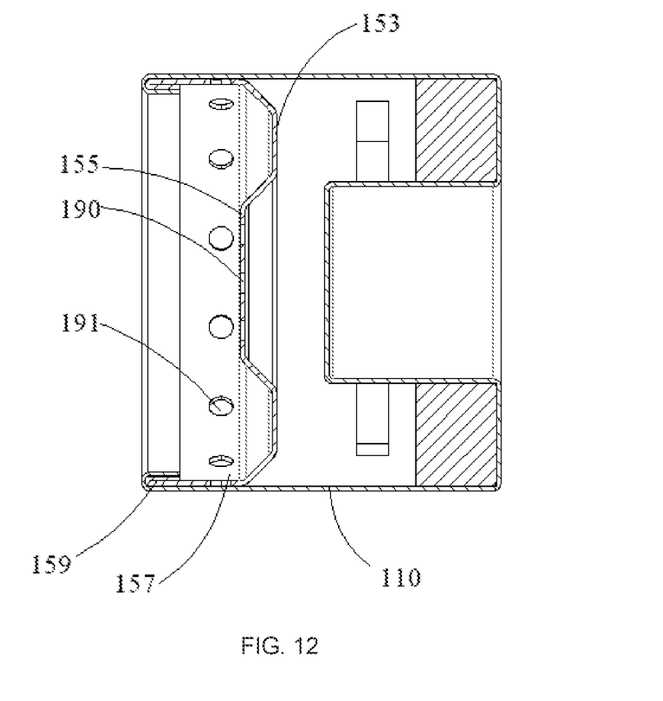
FIG. 12 is a schematic diagram of the connection structure of the end cover and the ignition box in some further embodiments of the present disclosure in the second perspective.

Referring to FIG. 11 and FIG. 12 in combination, some further embodiments of the present disclosure provide an integral ignition structure 100, of which a basic structure and a principle as well as technical effects produced are the same as those in some embodiments in the above. For the sake of concise description, reference can be made to corresponding contents in some embodiments in the above for those not mentioned in the present embodiment.

In the present embodiment, the integral ignition structure 100 includes an ignition box 110, an igniter 130, and an end cover 150. The ignition box 110 is open at one end, and has a closed end 113 and an open end 111 opposite to each other. The igniter 130 is provided at the closed end 113. The end cover 150 is provided at the open end 111, and is arranged to form, together with the ignition box 110, an ignition chamber 170. Flow-through holes 190 for communicating with the ignition chamber 170 are provided in the end cover 150. An ignition composition 171 is provided in the ignition chamber 170. The igniter 130 is configured to ignite the ignition composition 171 and generate an inflation gas. The end cover 150 is further configured to be plastically deformed under the effect of pressure of the inflation gas, so as to increase a volume of the ignition chamber 170.

In the present embodiment, the end cover 150 includes a connection ring 151 and a deformable plate 153 which are integrally arranged. The connection ring 151 is fixedly arranged on an inner side wall of the ignition box 110. The deformable plate 153 blocks the open end 111. The flow-through holes 190 are provided in the deformable plate 153. The deformable plate 153 is configured to be plastically deformed in a direction away from the closed end 113 under the effect of pressure of the inflation gas. A central position of the deformable plate 153 protrudes towards a direction away from the closed end 113, so as to form a boss structure 155, and the flow-through holes 190 are provided in the boss structure 155. Specifically, the boss structure 155 is provided at the central position of the deformable plate 153. The boss structure 155 can be formed by a stamping process, and is in an arched shape of a truncated cone, a surface thereof is provided with several flow-through holes 190, and an aperture of each flow-through hole 190 is smaller than a size of the ignition composition 171.

In the present embodiment, the connection ring 151 includes a first ring portion 157 and a second ring portion 159 which are integrally arranged. The first ring portion 157 is fixedly arranged on an inner side wall of the ignition box 110. The second ring portion 159 has one side connected to the first ring portion 157, and the other side connected to the deformable plate 153. The second ring portion 159 is configured to be driven by the deformable plate 153 to be detached from the inner side wall of the ignition box 110. Specifically, the first ring portion 157 and the second ring portion 159 are both in an annular shape, wherein the first ring portion 157 is welded on the inner side wall of the ignition box 110, and the second ring portion 159 can be attached to the inner side wall of the ignition box 110 when it is in a non-ignited state. The deformable plate 153 is deformed during ignition, wherein when the deformable plate 153 is deformed to a certain degree, it can drive the second ring portion 159 to be deformed and detached from the inner side wall of the ignition box 110, so that the deformable plate 153 can move farther, further increasing the volume in the ignition chamber 170, and thus improving the ability to adjust the air pressure.

In the present embodiment, a plurality of flow-assisting holes 191 are formed in the second ring portion 159. The plurality of flow-assisting holes 191 are configured to communicate the ignition chamber 170 and inside of an outer tube 210 when the second ring portion 159 is detached from the inner side wall of the ignition box 110. Specifically, by forming the flow-assisting holes 191, a velocity of the gas flowing into the gas compression chamber can be further increased, thus ensuring quick reaction. Meanwhile, the plurality of flow-assisting holes 191 each also have an aperture smaller than a size of the ignition composition 171, thus preventing the ignition composition 171 from rushing into the compressed gas chamber.

A working principle of the integral ignition structure 100 provided in the present embodiment is as follows: an electric detonator 131 is detonated when receiving a current, and energy generated acts on a recessed portion 115. When a set bursting pressure is reached, a weak indentation 117 in a surface of the recessed portion 115 bursts directionally according to a preset position, and ignites the ignition composition 171 in the ignition chamber 170, and then a large amount of gas is rapidly generated. Since a gas generation velocity is quite fast, the gas is too late to flow out through the flow-through holes 190 in the boss structure 155, therefore, the gas in the ignition chamber 170 rapidly builds up an internal pressure in an extremely short period of time. The air pressure acts on the deformable plate 153, and plastic deformation is generated at the boss structure 155 on the deformable plate 153. Due to the temperature sensitivity of the agent, a combustion velocity increases as the temperature rises, the plastic deformation increases as the temperature rises, and the volume of the space in the ignition chamber 170 increases as the plastic deformation increases. Finally, the pressure in the ignition chamber 170 is kept fluctuating in a relatively narrow range, ensuring that a flow rate and a pressure of the gas flowing into the compressed gas chamber also fluctuate in a relatively narrow range. In a high-temperature environment, since the time for establishing the internal pressure is extremely short, and the internal pressure increases rapidly, the plastic deformation generated at the boss structure 155 is quite large at this time. When the deformable plate 153 is deformed to a certain position, the second ring portion 159 is also deformed therewith, and is detached from the side wall of the ignition box 110, forming a larger circular arch shape together with the deformable plate 153. In this case, through holes in the second ring portion 159 are detached from original positions, and become the flow-through holes 190, further increasing the gas flow velocity, and reducing the pressure in the ignition chamber 170 at high temperatures.

Some further embodiments of the present disclosure provide a compressed-gas-type fuel gas generator 200, including the integral ignition structure 100 provided in the above embodiments.

In the present embodiment, the compressed-gas-type fuel gas generator 200 includes an outer tube 210 and the integral ignition structure 100. The integral ignition structure 100 includes an ignition box 110, an igniter 130, and an end cover 150. The ignition box 110 is open at one end, and has a closed end 113 and an open end 111 opposite to each other. The igniter 130 is provided at the closed end 113. The end cover 150 is provided at the open end 111, and is arranged to form, together with the ignition box, an ignition chamber 170. Flow-through holes 190 for communicating the ignition chamber 170 are provided in the end cover 150. An ignition composition 171 is provided in the ignition chamber 170. The igniter 130 is configured to ignite the ignition composition 171 and generate an inflation gas. The end cover 150 is further configured to be plastically deformed under the effect of a pressure of the inflation gas, so as to increase a volume of the ignition chamber 170. The outer tube 210 is filled with a compressed gas. The ignition box 110 is fixedly arranged at one end of the outer tube 210. The flow-through holes are configured to communicate the ignition chamber 170 and an inner space of the outer tube 210.

In the present embodiment, the ignition box 110 is provided at one end of the outer tube 210. A compressed gas chamber is formed in the middle of the outer tube 210. The compressed gas is filled inside the compressed gas chamber. Meanwhile, the ignition chamber 170 and the compressed gas chamber communicate through the flow-through holes. The other end of the outer tube 210 is provided with a guide cover 230 and a rupture disk. In the above, a structure and a blasting principle of the guide cover 230 and the rupture disk are consistent with the rupture structure in the conventional art, and will not be described in detail herein again.

In the present embodiment, by utilizing the plastic deformation characteristics inherent to metal materials, it is realized that when the compressed-gas-type fuel gas generator 200 is detonated at a high temperature, a normal temperature, and a low temperature, and when a filling amount of the chemical agent is the same, the end cover 150 generates different plastic deformation sizes at different combustion temperatures, and spaces of the ignition chamber 170 of different sizes and volumes are formed, effectively reducing the pressure difference of the ignition chamber 170 generated thereby, and stabilizing the time of forming a first blast wave, thus, the consistency of rupture time of the rupture disk is improved, and the starting time TTFG of the pressure is stabilized. All of these are beneficial to simplifying structural designs of the parts, simplifying components and type of the agent formulation, which is conducive to reducing the production costs, particularly costs of agent manufacturing process, and at the same time, reduction of high-temperature internal pressure also can realize use of a low-strength steel pipe for the shell, thus reducing purchasing costs of steel pipe.

The above-mentioned are merely for specific embodiments of the present disclosure, but the scope of protection of the present disclosure is not limited thereto. Changes or substitutions that may easily occur to those familiar with the art within the technical scope disclosed in the present disclosure should fall within the scope of protection of the present disclosure. Therefore, the scope of protection of the present disclosure should be based on the scope of protection of the claims.

INDUSTRIAL APPLICABILITY

The present disclosure provides an integral ignition structure and a compressed-gas-type fuel gas generator. The integral ignition structure includes an ignition box, an igniter, and an end cover. Compared with the related art, in the present disclosure, by providing the end cover capable of being plastically deformed, it is realized that when the compressed-gas-type fuel gas generator is detonated at a high temperature, a normal temperature, and a low temperature, and when the weight of the chemical agent is the same, different plastic deformation sizes are generated at different combustion temperatures, so as to form spaces of the ignition chamber of different sizes and volumes, effectively reducing the pressure difference of the ignition chamber generated thereby. Moreover, in cooperation with the use of the flow-through holes, a communication structure between the ignition chamber and the compressed gas chamber is optimized, thus, the consistency of the starting pressure TTFG at a high temperature, a normal temperature, and a low temperature is ensured, and the starting pressure and the pressure of the combustion chamber at high temperatures are effectively reduced, which is beneficial to reducing the material costs and weight of the shell.

Besides, it can be understood that the integral ignition structure and the compressed-gas-type fuel gas generator in the present disclosure are reproducible, and can be applied in a plurality of industrial applications. For example, the integral ignition structure and the compressed-gas-type fuel gas generator in the present disclosure can be applied to the technical field of airbags.

What is claimed is:

1. An integral ignition structure, comprising an ignition box, an igniter, and an end cover, wherein the ignition box has a closed end and an open end opposite to closed end; the igniter is provided at the closed end; and the end cover is provided at the open end, and is arranged to form, together with the ignition box, an ignition chamber, wherein at least one flow-through hole for communicating with the ignition chamber is formed in the end cover, an ignition composition is provided in the ignition chamber, the igniter is configured to ignite the ignition composition and generate an inflation gas, and the end cover is further configured to be plastically deformed under effect of a pressure of the inflation gas, so as to increase a volume of the ignition chamber;
wherein the end cover comprises a connection ring and a deformable plate which are integrally arranged, the connection ring is fixedly arranged on an inner side wall of the ignition box, the deformable plate blocks the open end, the at least one flow-through hole is formed in the deformable plate, and the deformable plate is configured to be plastically deformed in a direction away from the closed end under the effect of the pressure of the inflation gas.

2. The integral ignition structure according to claim 1, wherein the end cover is welded on the ignition box, so as to directly form the ignition chamber.

3. The integral ignition structure according to claim 1, wherein an end portion of the connection ring is flush with an end portion of the open end of the ignition box.

4. The integral ignition structure according to claim 1, wherein the flow-through hole includes a plurality of the flow-through holes, which are evenly distributed at a central position of the deformable plate, and each of the flow-through holes has a size smaller than a particle size of the ignition composition, so as to prevent the ignition composition from rushing out of the ignition chamber.

5. The integral ignition structure according to claim 1, wherein a central position of the deformable plate protrudes towards a direction away from the closed end, so as to form a boss structure, and the at least one flow-through hole is formed in the boss structure.

6. The integral ignition structure according to claim 1, wherein the connection ring comprises a first ring portion and a second ring portion which are integrally arranged, the first ring portion is fixedly arranged on the inner side wall of the ignition box, the second ring portion has one side connected to the first ring portion, and the other side connected to the deformable plate, and the second ring portion is configured to be driven by the deformable plate to be detached from the inner side wall of the ignition box.

7. The integral ignition structure according to claim 6, wherein a plurality of flow-assisting holes are formed in the second ring portion, the plurality of flow-assisting holes are configured for communicating with the ignition chamber when the second ring portion is detached from the inner side wall of the ignition box.

8. The integral ignition structure according to claim 1, wherein an end surface of the closed end is provided with a recessed portion that is recessed towards the open end, a surface of an end of the recessed portion close to the open end is provided with an indentation, so as to locally reduce a thickness of the recessed portion, and the igniter is at least partially accommodated in the recessed portion, and is configured to break through the indentation to ignite the ignition composition.

9. The integral ignition structure according to claim 8, wherein the igniter comprises an electric detonator and a fixed base, the electric detonator is accommodated in the recessed portion, the fixed base is connected to the electric detonator, and is at least partially disposed outside the recessed portion, and the fixed base is sealed to the ignition box.

10. The integral ignition structure according to claim 9, wherein a diameter of the recessed portion is slightly greater than a diameter of the electric detonator, and a recess depth of the recessed portion is slightly greater than a height of the electric detonator, so as to enable the electric detonator to be completely accommodated in the recessed portion, and the fixed base is welded on the ignition box outside the recessed portion, and is kept fixed and sealed.

11. The integral ignition structure according to claim 9, wherein a sealing ring is sleeved on the electric detonator, and the sealing ring is configured to block the recessed portion.

12. A compressed-gas-type fuel gas generator, comprising an outer tube and the integral ignition structure according to claim 1, wherein the outer tube is filled with a compressed gas, the ignition box is fixedly arranged at one end of the outer tube, and the at least one flow-through hole is configured for communicating the ignition chamber and an inner space of the outer tube.

13. The integral ignition structure according to claim 2, wherein the end cover comprises a connection ring and a deformable plate which are integrally arranged, the connection ring is fixedly arranged on an inner side wall of the ignition box, the deformable plate blocks the open end, the at least one flow-through hole is formed in the deformable plate, and the deformable plate is configured to be plastically deformed in a direction away from the closed end under the effect of the pressure of the inflation gas.

14. The integral ignition structure according to claim 3, wherein a plurality of the flow-through holes are formed, which are evenly distributed at a central position of the deformable plate, and each of the flow-through holes has a size smaller than a particle size of the ignition composition, so as to prevent the ignition composition from rushing out of the ignition chamber.

15. The integral ignition structure according to claim 3, wherein a central position of the deformable plate protrudes towards a direction away from the closed end, so as to form a boss structure, and the at least one flow-through hole is formed in the boss structure.

16. The integral ignition structure according to claim 4, wherein a central position of the deformable plate protrudes towards a direction away from the closed end, so as to form a boss structure, and the at least one flow-through hole is formed in the boss structure.

17. The integral ignition structure according to claim 5, wherein the connection ring comprises a first ring portion and a second ring portion which are integrally arranged, the first ring portion is fixedly arranged on an inner side wall of the ignition box, the second ring portion has one side connected to the first ring portion, and the other side connected to the deformable plate, and the second ring portion is configured to be driven by the deformable plate to be detached from the inner side wall of the ignition box.

18. The integral ignition structure according to claim 2, wherein an end surface of the closed end is provided with a recessed portion that is recessed towards the open end, a surface of an end of the recessed portion close to the open end is provided with an indentation, so as to locally reduce a thickness of the recessed portion, and the igniter is at least partially accommodated in the recessed portion, and is configured to break through the indentation to ignite the ignition composition.

19. The integral ignition structure according to claim 1, wherein an end surface of the closed end is provided with a recessed portion that is recessed towards the open end, a surface of an end of the recessed portion close to the open end is provided with an indentation, so as to locally reduce a thickness of the recessed portion, and the igniter is at least partially accommodated in the recessed portion, and is configured to break through the indentation to ignite the ignition composition.

* * * * *